United States Patent [19]

Wagner

[11] 3,835,138

[45] Sept. 10, 1974

[54] BRONCHODILATOR 5,6-DIHYDRO-TETRAZOLO(1,5-C) QUINAZOLINES

[75] Inventor: Eugene R. Wagner, Midland, Mich.

[73] Assignee: The Dow Chemical Company, Midland, Mich.

[22] Filed: Oct. 13, 1972

[21] Appl. No.: 297,467

[52] U.S. Cl............................ 260/256.4 F, 424/251
[51] Int. Cl............................................. C07d 51/48
[58] Field of Search.............................. 260/256.4 F

[56] References Cited
UNITED STATES PATENTS 3,389,137  6/1968  Mosby et al. .................... 260/256.4

Primary Examiner—Raymond V. Rush
Attorney, Agent, or Firm—Maynard R. Johnson

[57] ABSTRACT

Tetrazoloquinazoline compounds such as 5,6-dihydro-5-ethyl-8,9-dimethoxy-5-methyl-tetrazolo(1,5-c)-quinazoline are prepared by the reaction of a 5-(2-aminophenyl)tetrazole with a ketone or aldehyde. The compounds are useful as bronchodilator agents.

6 Claims, No Drawings

BRONCHODILATOR 5,6-DIHYDRO-TETRAZOLO(1,5-C) QUINAZOLINES

BACKGROUND OF THE INVENTION

5-Substituted-tetrazolo (1,5-c)quinazolines and certain 5-hydroxy-5,6-dihydro-tetrazolo(1,5-c) quinazolines have been prepared by Postovskii et al., Khimiya Geterotsiklicheskikh Soedinenii, 2, 130 (1966) and 3: 944 (1967); and see Current Abstracts of Chemistry, 37 (340) 142673; 37 (337); 140057; and 39 (359) 1600 84-5.

The substituted 5-(2-aminophenyl)tetrazole employed as starting materials can be prepared by the reaction of the corresponding anthranilonitrile with sodium azide and ammonium chloride, by the method of Finnegan et al., J. Am. Chem. Soc. 80, 3908 (1958) with the addition of lithium chloride, according to Holland and Pereira, J. Med. Chem. 10, 149 (1967). The anthranilonitriles can be prepared by known methods, McKee et al., J. Am. Chem. Soc. 68, 1902 (1946), and 69, 940 (1947) and Keffler, J. Chem. Soc. 119, 1476 (1921).

SUMMARY OF THE INVENTION

This invention is directed to 5,6-dihydro-tetrazoloquinazoline compounds and is particularly directed to 5,6-dihydro-tetrazolo(1,5-c)quinazoline compounds of the formula:

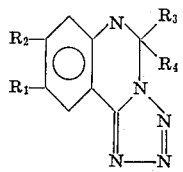

wherein $R_1$ and $R_2$ each independently represent hydrogen or lower alkoxy; or $R_1$ and $R_2$ taken together represent methylenedioxy; $R_3$ represents hydrogen or methyl; $R_4$ represents hydrogen, lower alkyl, carboxy, carboxymethyl, lower alkoxy carbonyl, or lower alkoxy carbonylmethyl; and $R_3$ and $R_4$ taken together represent butylene. The terms "lower alkyl" and "lower alkoxy" refer to such moieties of one to two to three carbon atoms. The term "halo" is employed to refer to chloro, bromo and fluoro.

The compounds of the invention are prepared by the reaction of a 5-(2-aminophenyl)tetrazole corresponding to formula II

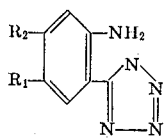

with an aldehyde or ketone corresponding to formula III

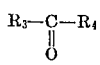

In the above formulae II and III, the moieties $R_1$, $R_2$, $R_3$ and $R_4$ have the significance set out above with respect to Formula I. The reaction proceeds when the reactants are contacted and mixed, preferably in the presence of an inert organic solvent as a reaction medium. Suitable inert solvents include chloroform benzene, methanol, ethanol, propanol and isopropanol, and other inert organic liquids in which the reactants are soluble, which liquids have a boiling point between about 0° and 130°C. Ethanol is the preferred solvent of choice. The reaction proceeds at temperatures from about 0°C. to about 130°C. In many cases, the reaction proceeds at a desirably rapid rate at room temperature; in other cases it is desirable to heat the reaction mixture to the boiling temperature under reflux. The reaction is generally complete within about 5 minutes to about 4 hours, depending upon temperature, choice of solvent (if used) and the particular reactants employed. The product can be separated by conventional procedures, such as evaporation of reaction medium and unreacted aldehyde or ketone, or dilution and cooling of the reaction mixture to induce crystallization of the product. The product can be purified by conventional procedures such as recrystallization and washing.

The exact proportions of the reactants to be employed are not critical, some of the desired product being obtained when the reactants are combined over a wide range of proportions (e.g., a ten fold molar excess of either reactant), the reaction consumes the reactants in equimolar proportions, and the presence of large excesses of the ketone or aldehyde starting material can make separation unnecessarily difficult due to solubility of the product in the excess reactant. In a preferred procedure, the reactants are employed in proportions from substantially equimolar amounts of each reactant to about 10 percent molar excess of the ketone or aldehyde reactant.

EXAMPLE 1

5-(2-Aminophenyl)tetrazole (2 grams; 0.012 mole) was dispersed in 30 milliliters of chloroform. 5 Milliliters (0.068 mole) of acetone was added and the resulting solution was heated at the boiling temperature until crystals formed in the reaction mixture. The mixture was filtered, and the product collected on the filter. The 5,6-dihydro-5,5-dimethyl-tetrazolo(1,5-c)quinazoline product was found to melt at 202°–204°C. The structure of the product was confirmed by infrared spectroscopy and nuclear magnetic resonance analysis, and by mass spectroscopic determination of molecular weight [found m/e 201 (M+); calculated 201.2].

5,6-Dihydro-5-ethyl-5-methyl-tetrazolo(1,5-c)quinazoline, melting at 144°–145°C., and 5,6-dihydro-5-methyl-tetrazolo(1,5-c)quinazoline-5-acetic acid, melting at 91°–94°C. are prepared in substantially the same procedure.

EXAMPLE 2

The following compounds are prepared as described above using about 8 milliliters of ethanol per gram of substituted 5-(2-aminophenyl)tetrazole reactant as a reaction medium and a 5 to 10 percent molar excess of the aldehyde. The table identifies the compounds and the reactants in reference to the $R_1$, $R_2$, $R_3$ and $R_4$ moieties set out above with reference to formulae I, II, III.

TABLE I

| R₁ | R₂ | R₃ | R₄ | M.P. | Calc'd analysis | Found analysis |
|---|---|---|---|---|---|---|
| H | H | CH₃ | CH₃ | 202-4 | C, 59.69; H, 5.51; N, 34.80 | C, 58.93; H, 5.58; N, 34.92. |
| H | H | —CH₂CH₂CH₂CH₂— | | 167-9 | C, 63.42; H, 5.77; N, 30.82 | C, 63.90; H, 5.77; N, 30.81. |
| H | H | H | H | 191-2 | C, 55.48; H, 4.07; N, 40.44 | C, 55.34; H, 4.14; N, 41.15. |
| OCH₃ | OCH₃ | CH₃ | CH₂CH₃ | 179-80 | C, 56.71; H, 6.22; N, 25.44 | C, 56.24; H, 6.16; N, 25.12. |
| OCH₃ | OCH₃ | H | CH₃ | 196-7 | C, 53.43; H, 5.30; N, 28.33 | C, 53.00; H, 5.25; N, 28.58. |
| —O—CH₂—O— | | H | CH₃ | 226-7 | C, 51.95; H, 3.92; N, 30.29 | C, 51.49; H, 4.02; N, 30.65. |
| H | H | H | CH(CH₃)₂ | 145-6 | C, 61.38; H, 6.09; N, 32.54 | C, 61.34; H, 6.19; N, 33.00. |
| OCH₃ | OCH₃ | H | CH(CH₃)₂ | 198-200 | C, 56.71; H, 6.22; N, 25.44 | C, 56.07; H, 6.06; N, 24.73. |
| H | H | H | CH₃ | 157-8 | C, 57.74; H, 4.85; N, 37.41 | C, 58.06; H, 4.87; N, 37.40. |
| H | H | H | COOH | 203-4 | M.S.+M⊕217; C, 49.77; H, 3.25; N, 32.25 | C, 49.7; H, 3.45; N, 31.6. |
| H | OCH₃ | H | H | 218-9 | C, 53.19; H, 4.46 | C, 53.0; H, 4.67. |
| H | OCH₃ | H | CH₃ | 171-3 | C, 55.29; H, 5.10 | C, 55.4; H, 5.17 |
| OCH₃ | OCH₃ | H | H | 197-200 | C, 51.49; H, 4.75 | C, 51.3; H, 4.95. |

EXAMPLE 3

In a procedure similar to that described above 5,6-dihydro-5-propyl-tetrazolo(1,5-c)quinazoline, melting at 111°–112°C. was prepared by the room temperature reaction of 5-(2-aminophenyl)tetrazole with excess butyraldehyde. No inert organic solvent was employed, and the excess butyraldehyde was removed by evaporation. The product was crystallized from a mixture of ethanol and water. Elemental analysis confirmed the assigned structure.

Bronchodilator activity of representative tetrazoloquinazoline compounds is examined in the KonzettRossler guinea pig preparation according to accepted procedures. See Konzett and Rossler; Arch. f. exp. Path. u. Pharmakol. 195: 71–74 (1940); and Rosenthale and Dervinis, Arch. int. Pharmacodyn 172: 91–94 (1968). In this procedure, an anesthetized guinea pig is artificially respired with a fixed volume of air. This volume of air is selected to exceed the lung capacity, and the excess "overflow" volume is measured. Bronchoconstriction is produced by intravenous injection of a selected agonist (histamine, serotonin or acetylcholine) at 5 minute intervals at a dosage selected to produce 50 to 80 percent bronchoconstriction, as indicated by the resultant increase in "overflow" volume. Test compounds are evaluated by administering a test compound two minutes before the next agonist dose following three previous agonist doses resulting in relatively uniform (± 10 percent) bronchoconstriction. Bronchodilator activity, indicated by ability of a test compound to block the agonist response, is expressed in terms of percent (%) block, calculated by dividing the agonist response(s) after the test drug by the average of the three agonist response preceeding the test compound, multiplying by 100 and subtracting this value from 100 percent. Aminophylline, a known bronchodilator, is also employed as a standard for comparison. In such procedure percent block is determined for an intravenous dosage of 10 milligrams aminophylline per kilogram, then a test compound, then a repeat dosage of aminophylline. The results can be expressed as a percent of aminophylline, calculated by expressing the percent blockade produced by the compound as a percentage of the average of the percent blockade produced by the doses of aminophylline which precede and follow it.

Tetrazoloquinazoline test compounds are employed as test compounds in this procedure at a dosage rate of 10 milligrams per kilogram. In replicated operations with each compound, 5,6-dihydro-tetrazolo(1,5-c)quinazoline, 5,6-dihydro-5-n-propyl-tetrazolo(1,5-c) -c)quinazoline, 5,6-dihydro-5-ethyl-5-methyl-tetrazolo(1,5-c)quinazoline, 5,6-dihydro-8,9-dimethoxy-5-ethyl-5-methyl-tetrazolo(1,5-c)quinazoline, 5,6-dihydro-8,9-dimethoxy-5-methyl-tetrazolo-(1,5-c)quinazoline, ethyl 5,6-dihydro-5-methyl-tetrazolo-(1,5-c)quinazoline-5-acetate and 5,6-dihydro-8,9-dimethyoxy-tetrazolo(1,5-c)quinazoline are found to give average percent block of histamine of 57, 28, 55, 45, 59, 20 and 43 percent respectively, and to be about 82, 44, 67, 95, 134, 30 and 60 percent, respectively, as active as aminophylline.

In similar operations, 5,6-dihydro-5-isopropyltetrazolo(1,5-c)quinazoline is found to produce 50 and 60 percent blockade against serotonin and acetylcholine, respectively, and to give results equal to or slightly greater than those obtained with aminophylline.

What is claimed is:

1. A 5,6-dihydro-tetrazolo(1,5-c)quinazoline compound corresponding to the formula:

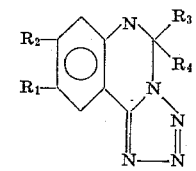

wherein $R_1$ and $R_2$ each independently represent hydrogen or lower alkoxy; or $R_1$ and $R_2$ taken together represent methylenedioxy; $R_3$ represents hydrogen or methyl; $R_4$ represents hydrogen, lower alkyl, carboxy, carboxymethyl, lower alkoxy carbonyl, or lower alkoxy carbonyl methyl, and $R_3$ and $R_4$ taken together represent butylene.

2. A compound of claim 1 wherein $R_1$ and $R_2$ both represent methoxy.

3. A compound of claim 2 wherein $R_3$ represents hydrogen.

4. A compound of claim 2 wherein $R_4$ represents methyl.

5. A compound of claim 1 wherein $R_1$ and $R_2$ both represent methoxy, $R_3$ represents methyl and $R_4$ represents ethyl.

6. A compound of claim 1 wherein $R_1$, $R_2$, $R_3$ and $R_4$ all represent hydrogen.

* * * * *

UNITED STATES PATENT OFFICE
CERTIFICATE OF CORRECTION

Patent No. 3,835,138     Dated September 10, 1974

Inventor(s) Eugene R. Wagner

It is certified that error appears in the above-identified patent and that said Letters Patent are hereby corrected as shown below:

Column 1, line 35, the formula should appear as follows:

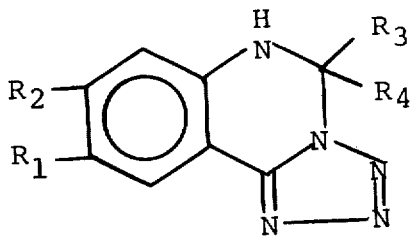

Column 4, line 23, delete "-c)";

Column 4, line 29, correct spelling of "dimethoxy";

Column 4, line 45, the formula should appear as follows:

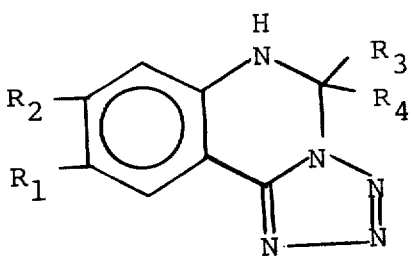

Signed and sealed this 10th day of December 1974.

(SEAL)
Attest:

McCOY M. GIBSON JR.
Attesting Officer

C. MARSHALL DANN
Commissioner of Patents